Figure 1:
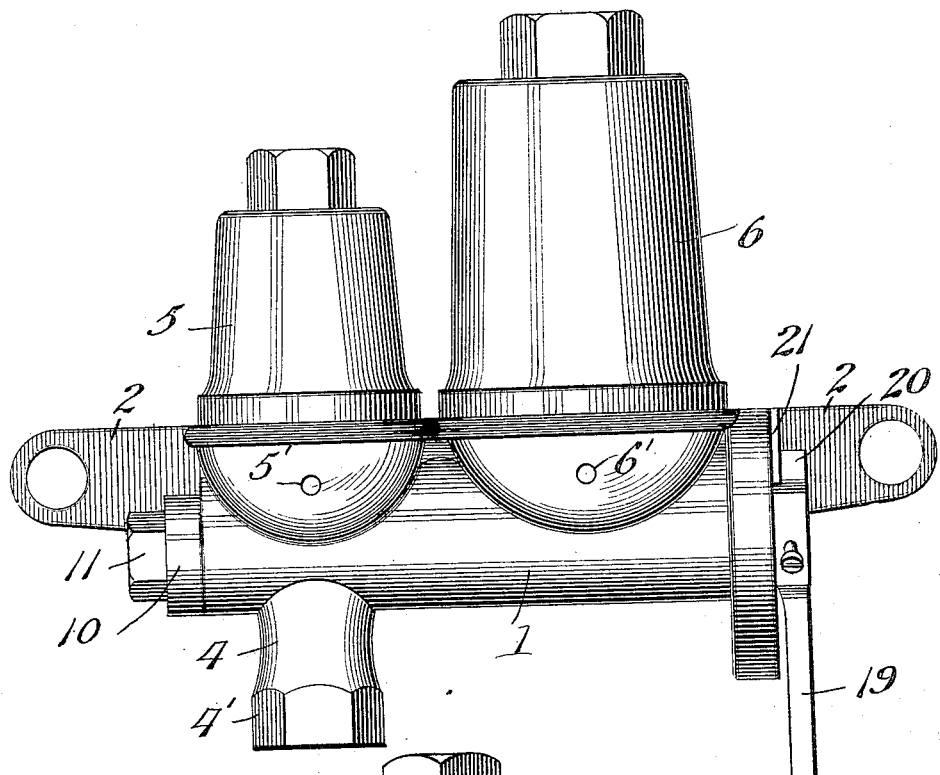

No. 816,409. PATENTED MAR. 27, 1906.
W. WILHELM.
PRESSURE RETAINING VALVE FOR AIR BRAKE SYSTEMS.
APPLICATION FILED JULY 11, 1905.

2 SHEETS—SHEET 1.

Witnesses
Phil. E. Barnes
C. C. Hines

Inventor
Walter Wilhelm
By Victor J. Evans
Attorney

No. 816,409. PATENTED MAR. 27, 1906.
W. WILHELM.
PRESSURE RETAINING VALVE FOR AIR BRAKE SYSTEMS.
APPLICATION FILED JULY 11, 1905.
2 SHEETS—SHEET 2.
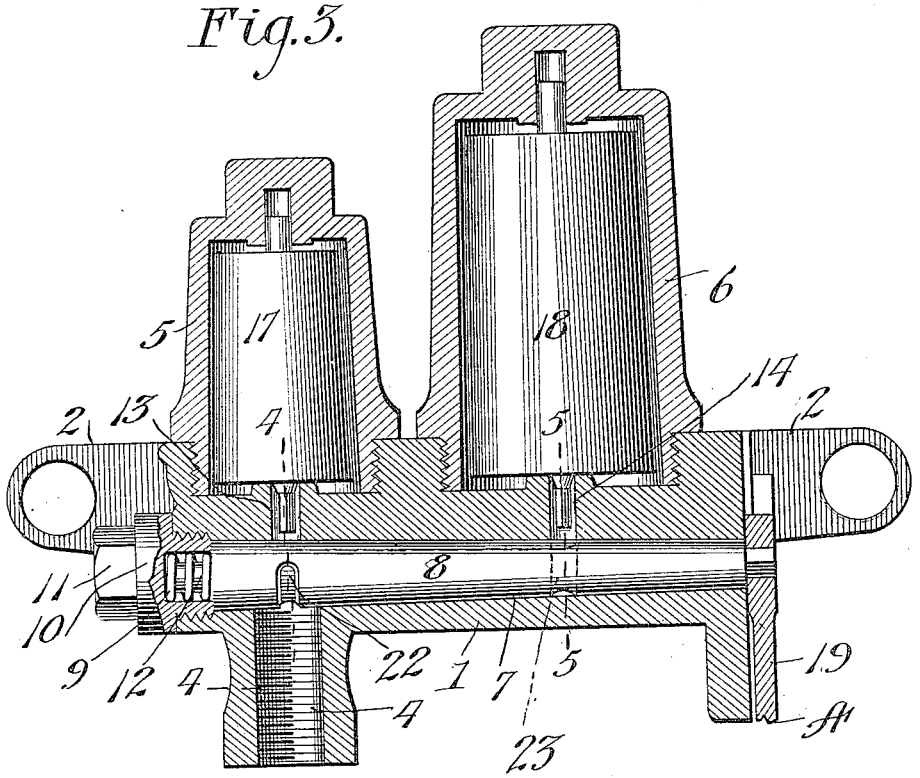
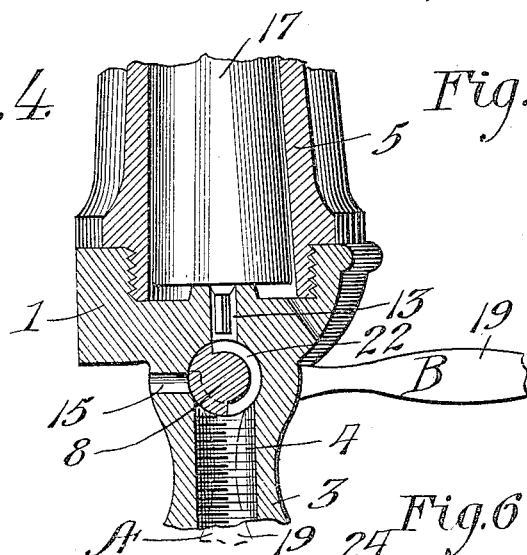
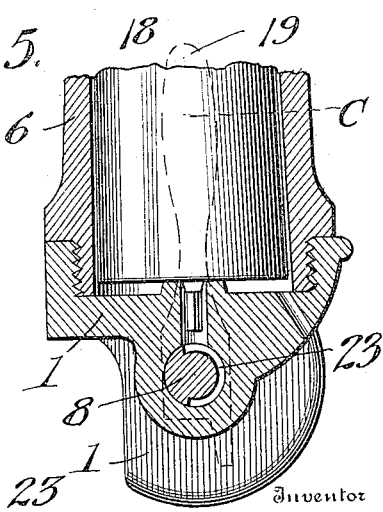
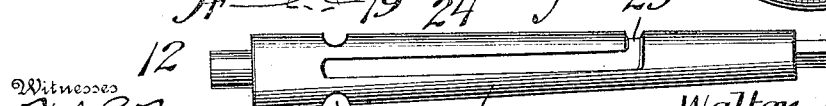
Witnesses
Phil E. Barnes
C. C. Hines
Inventor
Walter Wilhelm
Victor J. Evans
Attorney

UNITED STATES PATENT OFFICE.

WALTER WILHELM, OF MOUNT SAVAGE, MARYLAND.

PRESSURE-RETAINING VALVE FOR AIR-BRAKE SYSTEMS.

No. 816,409.

Specification of Letters Patent.

Patented March 27, 1906.

Application filed July 11, 1905. Serial No. 269,219.

*To all whom it may concern:*

Be it known that I, WALTER WILHELM, a citizen of the United States of America, residing at Mount Savage, in the county of Allegany and State of Maryland, have invented new and useful Improvements in Pressure-Retaining Valves for Air-Brake Systems, of which the following is a specification.

This invention relates to a pressure-retaining valve for air-brake systems of that type in which the brake-shoes are applied when any reduction of pressure in the train-pipe occurs, as when the engineer adjusts his brake-valve to the pressure-reducing position, said pressure-retaining valve being employed to retain sufficient air-pressure within the brake-cylinder to prevent any acceleration of speed of the car or train after the triple valve has moved to position for permitting air to escape from the brake-cylinder and while the auxiliary reservoir is being recharged from the train-pipe.

It has been customary heretofore to employ a pressure-retaining valve embodying a single-weighted valve device adapted to offer an invariable resistance to the escape of air from the brake-cylinder when thrown into operation for retaining purposes, the operation of the valve resulting in the brake-shoes being applied with the same pressure irrespective of the character of the grade which is to be descended or of the weight of the car, resulting in too much braking pressure being used when the grade is light and the car unloaded. In order to avoid this objection, the use of a pressure-retaining valve having two valve devices, one for low braking pressure and the other for high braking pressure when operated in conjunction with the first-named valve, has been suggested; but this valve is also objectionable in use on account of its complex structure and the liability of the train hands adjusting the same to improper position at night or at other times when the valve-handle cannot readily be observed and its adjustment to proper position is mainly a matter of guesswork.

The object of the present invention is to provide a pressure-retaining valve which is free from the objections to both types of retaining-valves above referred to and which employs two valve devices, one for retaining a definite pressure within the brake-cylinder for light braking pressure and the other for retaining within the brake-cylinder a higher pressure for heavy braking pressure, together with a governing device for controlling the discharge of air from the brake-cylinder to the atmosphere and said valve devices, whereby the braking pressure may be regulated according to the character of the grade to be descended and the weight of the car or train, said governing device having an operating-handle adjustable to certain well-defined positions in one direction of movement, whereby liability of the valve being incorrectly operated at any time will be avoided.

The preferred embodiment of the invention is illustrated in the accompanying drawings, in which—

Figure 2:
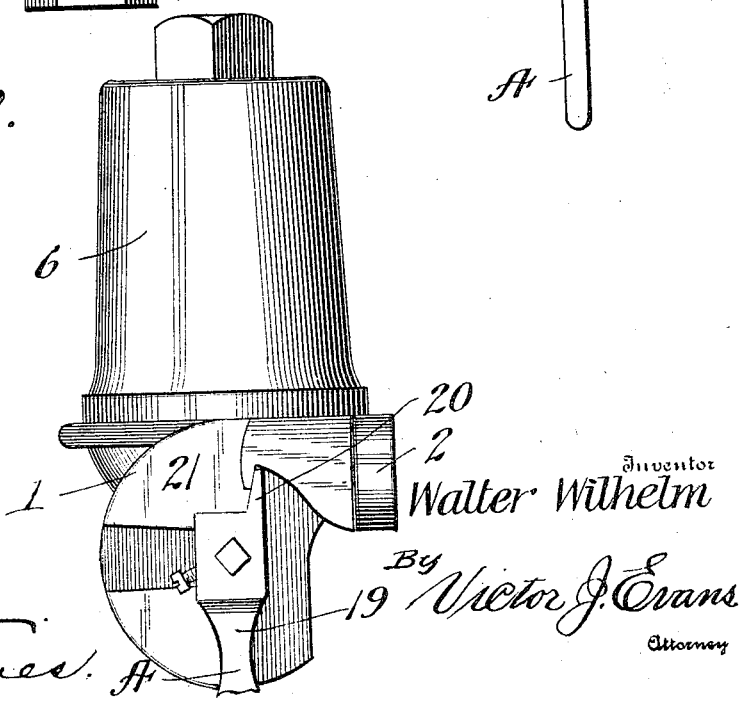

Figure 1 is a front elevational view of the improved pressure-retaining valve. Fig. 2 is an end elevational view thereof. Fig. 3 is a vertical longitudinal section, showing the parts in the release position. Fig. 4 is a vertical cross-section on the line 4 4 of Fig. 3, showing the governing member adjusted to bring the low-pressure-valve device into operation and also showing in dotted lines the release position of said governing member. Fig. 5 is a vertical cross-section on the line 5 5 of Fig. 3, showing the governing device adjusted to bring the high-pressure-valve device into operation; and Fig. 6 is a plan view of the governing member.

Referring now more particularly to the drawings, the numeral 1 represents a valve-body, which comprises a casting provided with bolting-flanges 2 and a connection 3, the latter being formed with a threaded bore 4 to receive the end of a release-pipe leading from the exhaust-port of the triple valve. The connection 4 is provided with an angular or hexagonal end 4' for the reception of a wrench or other similar tool, by which it may be coupled to the release-pipe. In this operation of course the casting 1 is rotated about the release-pipe and after it has been adjusted to the proper position is fastened securely in position upon the car by bolts passed through the flanges 2. The valve-body is formed in its upper side with depressions which are internally threaded to receive the valve chambers or casings 5 and 6 and also is formed in the front thereof with exhaust or vent passages 5' and 6', connecting said chambers or casings with the atmosphere.

Formed in the valve-body is a tapered longitudinal bore or passage 7, receiving a governing member 8, said governing member being in the form of a turn-plug tapered to correspond to said bore. The plug is held seated in position by a coiled spring 9, arranged within a hollow plug 10, threaded into the larger end of the bore 7 and provided with an angular head 11 to receive the wrench or other suitable tool, by which it may be conveniently applied and removed. The spring 9 surrounds a short stem or projection 12, projecting from the larger end of the turn-plug, and exerts pressure on said plug to normally hold it seated tightly in the bore 7. Inlet-passages 13 and 14 lead from the bore 7 to the respective casings 5 and 6, the passage 13 being in alinement with the passage 4. At the intersection of the two passages 4 and 13 a release or exhaust port 15 leads through the rear of the valve-body to the atmosphere.

A weighted valve 17 is disposed in the casing 5 and controls the passage 13. The valve 17 is adapted to offer a certain resistance to exhaust of air from the brake-cylinder to the atmosphere and for sake of description may be properly termed a "low-pressure" valve. In practice this valve is preferably weighted to maintain a low or minimum resistance and to maintain a low or minimum resistance and braking pressure of, say, ten pounds per square inch to maintain an equivalent pressure in the brake-cylinder, and thereby adapt the brake-shoes to be held with a light braking pressure against the wheels. The valve 18, on the other hand, is weighted to offer a higher resistance to the exhaust of air from the brake-cylinder to the atmosphere and may be termed a "high-pressure" valve. In practice this valve may be weighted to yield a pressure resistance of, say, twenty pounds to the square inch to maintain such pressure in the brake-cylinder to hold the brakes applied with a higher degree of force on the car-wheels. The valve 17 will be thrown into action when the car is light or unloaded or descending a light grade, so as to prevent too heavy braking pressure from being thrown upon the wheels thereof, while the valve 18 will be thrown into action when the car is heavy or loaded or is descending a heavy grade, thus enabling a brakeman or other trainman to regulate the braking pressure according to the conditions demanding a low or high braking pressure.

The governing-plug has its reduced end projecting exteriorly from the valve-body and provided with an operating-handle 19, having a stop lug or finger 20 to engage a stop-shoulder 21 on the valve-body to arrest the movement of the valve when the latter is moved and adjusted to its normal position. This handle is adapted to be adjusted to the three positions A, B, and C, the first to set the valve to release position, in which the air from the brake-cylinder is permitted to exhaust to the atmosphere without resistance, the second to set the valve to bring into operation the valve device 17 for low braking pressure, and the third to bring the valve device 18 into operation to obtain high braking pressure.

The governing-plug 8 is provided at its larger end with a nearly-annular groove 22 and adjacent its reduced end with an approximately semicircular groove 23. In the top of the plug, or that portion which is uppermost when the plug is in its normal position, a longitudinal groove or feed-passage 24 is formed which communicates at one end with the upper end of the groove 23 and terminates at its opposite end between the terminals of the groove 22. The groove 22 is adapted to register with passages 4 and 13 and the groove 23 with passages 14. When the handle 19 is in position A, the groove 22 will be out of coincidence with the passage 13, but will connect the passage 4 with the vent-passage 15 to permit of the free exhaust of air from the exhaust-port of the triple valve. In this position the handle 19 hangs pendent or directly downward and the stop-finger 20 is in contact with the stop-shoulder 21. When the handle is elevated to position B, in which it lies horizontal or at an angle of ninety degrees to position A, the plug 8 will be turned to the position shown in Fig. 4, in which it cuts off communication between the passage 4 and the passage 15 and opens communication through the groove 22 with the passage 13 and accordingly with the casing 5 to permit the air from the brake-cylinder to act on the valve 17. When the valve is adjusted to position C, in which it extends straight upward or at an angle of one hundred and eighty degrees to position A, the passage 24 will be brought in communication with the passage 4 and the groove 23 with the valve chamber or casing 6, while communication between passage 4 and valve-casing 5 and vent-port 15 will be closed, thus permitting the air from the brake-cylinder to feed through passage 14 to the valve-chamber 6 and to act upon the valve 18.

In operation when all the air is to be exhausted from the brake-cylinder the regulating-plug is adjusted to position A, thus permitting the air to exhaust from the brake-cylinder directly through port 15 to the atmosphere. If a low braking pressure is to be retained in the brake-cylinder, the handle is turned to position B, thus connecting the brake-cylinder through passage 4, groove 22, and passage 13 with the valve-chamber 5. The valve 17 will then be raised by the pressure of the air and permit the air to exhaust from the brake-cylinder through the outlet-port 5′ until the pressure in the brake-cylinder is reduced to ten pounds, which pressure will be retained by the closing of said valve to hold the brakes applied with a low degree of braking power, which will be sufficient when the car is descending a light grade or is unloaded. When a heavy grade is to be descended or the car is loaded and a maximum braking pressure is desired, the handle is adjusted to the third position C, thereby closing communication between the brake-cylinder and the vent-port 15 and valve-chamber 5 and opening communication between said cylinder and the valve-casing 6 through the passage 4, groove 24, groove 23, and passage 14. The valve 18 will thereby be raised, and the escape of the air to the atmosphere through the vent-ports 6' will be permitted until the pressure in the brake-cylinder is reduced to twenty pounds per square inch, when said valve will close and retain such pressure therein to hold the brake-shoes applied with sufficient force to control the car. If in the use of either valve device the pressure in the brake-cylinder at the time said valve device is brought into use is lower than that which the valve device is adapted to retain therein, the valve device will remain closed until such pressure is secured and will maintain such pressure while it is in communication with the brake-cylinder.

It will thus be seen that by means of my improved pressure-retaining valve the air in the brake-cylinder may be entirely exhausted to the atmosphere to release the brakes to permit the cars to run free under ordinary conditions and that the pressure in the cylinder may also be controlled to effectually regulate the braking pressure of the brake-shoes to control light and heavy cars and to regulate the running thereof according to the character of a grade in the road which is to be descended, thus enabling the required braking pressure to be obtained and obviating liability of the buckling of cars of a train from unequal pressure or the flattening of the wheels of a car from overpressure. It will further be seen that the governing device of the valve is adjustable to its several operative positions through well-defined prescribed movements of the actuating-handle 19 in one direction of movement of said handle, so that the valve may be adjusted with precision at all times, thus obviating liability of incorrect adjustment on dark nights and at other times when it is practically impossible for the brakeman to adjust the valve in accordance with gaging devices which cannot be observed. By also adapting the plug to move solely in one direction in which the releasing and high-pressure positions are at the opposite ends of an arc of travel and the low-pressure position intermediate the same or at the center of the arc, the liability of confusion which would be apt to arise if the plug were movable in opposite directions from the neutral or release positions to the high and low pressure positions will also be obviated. My invention therefore provides a pressure-retaining valve which affords a high degree of safety of control in the running of trains in which the cars vary in weight and on roads having heavy grades.

Having thus described the invention, what is claimed as new is—

1. A pressure-retaining valve provided with a release exhaust-passage and high and low pressure exhaust-passages, valves controlling the said high and low pressure exhaust-passages, and a controlling device having three operative positions to, respectively, connect a brake-cylinder with the atmosphere, connect said cylinder with the low-pressure exhaust-passage, and to connect the cylinder directly with the high-pressure exhaust-passage independent of the low-pressure exhaust-passage, said device being movable in one direction from the release position to successively connect the brake-cylinder with said high and low pressure exhaust-passages, substantially as described.

2. In a pressure-regulating device for air-brake systems, the combination of a body provided with a release outlet-passage and high and low pressure valves controlling said high and low pressure passages, and a controlling device adjustable to one position to connect the brake-cylinder with the atmosphere through said release outlet-passage, to a second position for connecting the brake-cylinders with the low-pressure valve and to a third position for connecting the brake-cylinder with the high-pressure valve, said positions being respectively, at one end at the center, and at the other end of a defined arc of travel substantially as described.

3. In a pressure-retainer for air-brake systems, the combination of a body provided with valve-chambers, each having a port leading to the atmosphere, said body also being provided with a release exhaust-passage, valves in said chambers controlling said ports, a turn-plug provided with coöperating passages, said plug being adjustable in an arc of one hundred and eighty degrees to one position to connect the brake-cylinder with the release exhaust-passage, to a second position to connect the brake-cylinder with the low-pressure chamber, and to a third position to connect the brake-cylinder with the high-pressure chamber independent of the low-pressure chamber, said positions being, respectively, at one end, at the center, and at the other end of said arc, and a handle for actuating said plug.

4. A pressure-retaining valve provided with an inlet-passage, a release exhaust-passage, high and low pressure exhaust-passages, a bore connected with the inlet-passage and extending between the high and low pressure passages, valves controlling the said high and low pressure passages, a plug-valve disposed longitudinally in said bore and movable in an arc of one hundred and eighty degrees, said valve being provided at one end with a nearly-circular groove and at its opposite end with a semicircular groove to coöperate respectively with the inlet, release and low-pressure exhaust-passage and the high-pressure exhaust-passage, and with a longitudinal groove terminating at one end between the ends of the nearly-circular groove and connected at its opposite end with the one end of the semicircular groove, and a handle for actuating said valve, substantially as specified.

In testimony whereof I affix my signature in presence of two witnesses.

WALTER WILHELM.

Witnesses:
    MARGARET GRAHAME,
    ELLEN O'NEILL.